(12) United States Patent
Chiavario et al.

(10) Patent No.: US 7,640,873 B2
(45) Date of Patent: Jan. 5, 2010

(54) CRISSCROSS SEED DISTRIBUTION SYSTEM AND METHOD

(75) Inventors: Kevin Charles Chiavario, Sandwich, IL (US); Ricardo Diaz, Westchester, IL (US)

(73) Assignee: CNH America, LLC., New Holland, PA (US)

( * ) Notice: Subject to any disclaimer, the term of this patent is extended or adjusted under 35 U.S.C. 154(b) by 126 days.

(21) Appl. No.: 11/851,869

(22) Filed: Sep. 7, 2007

(65) Prior Publication Data

US 2009/0064910 A1 Mar. 12, 2009

(51) Int. Cl.
 A01B 49/00 (2006.01)
 A01B 63/00 (2006.01)
 A01C 5/00 (2006.01)
 A01C 7/00 (2006.01)
 A01C 7/14 (2006.01)

(52) U.S. Cl. .................. 111/57; 111/175; 111/186; 172/311; 172/456

(58) Field of Classification Search ......... 111/174–178, 111/186–188, 179, 925, 54, 57, 62, 63, 66, 111/170, 171; 172/311, 452, 456; 406/141–143, 406/146, 124, 120, 181, 41; 222/630, 195, 222/142, 132, 145.7, 145.8, 136, 144.5, 145.1; 221/211, 278
See application file for complete search history.

(56) References Cited

U.S. PATENT DOCUMENTS

| 4,202,283 A | 5/1980 | Wiesboeck |
| 5,265,547 A | 11/1993 | Daws |
| 5,592,889 A | 1/1997 | Bourgault |
| 5,740,746 A | 4/1998 | Ledermann et al. |
| 6,047,652 A | 4/2000 | Prairie et al. |
| 6,325,004 B1 | 12/2001 | Smith |
| 6,935,254 B2 | 8/2005 | Ostrander et al. |
| 7,111,566 B2 | 9/2006 | Horn |
| 7,140,310 B2 | 11/2006 | Mayerle et al. |
| 7,237,495 B2 | 7/2007 | Harnetiaux |

Primary Examiner—Christopher J. Novosad
(74) Attorney, Agent, or Firm—Rebecca L. Henkel; John William Stader

(57) ABSTRACT

A system for distributing seeds is configured to be transported by an agricultural vehicle along a direction of travel. The system includes a main frame extending along the direction of travel, a first wing frame extending from a first side of the main frame in a first direction that is substantially perpendicular to the direction of travel, and a second wing frame extending from a second side of the main frame in a second direction that is substantially perpendicular to the direction of travel. The system further includes at least one row unit arranged on the first side of the main frame and supported by the first wing frame, at least one row unit arranged on the second side of the main frame and supported by the second wing frame, a first seed reservoir arranged on the first side of the main frame, and a second seed reservoir arranged on the second side of the main frame. A first seed delivery hose assembly system connects the first seed reservoir to the at least one row unit arranged on the second side of the main frame, and a second seed delivery hose assembly system connects the second seed reservoir to the at least one row unit arranged on the first side of the main frame.

13 Claims, 3 Drawing Sheets

CRISSCROSS SEED DISTRIBUTION SYSTEM AND METHOD

STATEMENT REGARDING FEDERALLY SPONSORED RESEARCH

Not applicable.

CROSS-REFERENCE TO RELATED APPLICATIONS

Not applicable.

BACKGROUND OF THE INVENTION

Agricultural implements, such as seed distribution machines towed by tractors, are often employed to distribute materials such as seeds, fertilizers, pesticides, other chemicals, and other materials along the ground as they travel. Commonly, slurry of a given material is separated into finely-granulated particles and then distributed in a highly controlled manner (e.g., one particle at a time) by one or more meters that are positioned at different locations along the implement.

Seed distribution machines generally include a laterally extending toolbar that supports a plurality of parallel planting units (also known as row units). The toolbar is typically coupled to a tractor or like vehicle through a frame suitable for towing the planting assembly along a field. Each row unit includes a seed meter to dispense seeds at a controlled rate into a seed furrow as the meter is advanced above and along the seed furrow during operation. One such seed metering assembly is described in U.S. Pat. No. 6,401,638 assigned to Case Corp., Racine, Wis., the disclosure of which is hereby incorporated by reference for the purpose of general background information. Generally, seeds are delivered to the metering assembly from a seed reservoir located on the row unit or, alternatively, from a smaller container fed from a large centralized reservoir used to feed all or a portion of the row units.

Air pressure differential seed meters, which are commonly known as air seed meters, are generally of two types, the first being a positive pressure type meter, and the second relying upon negative pressure or a vacuum. A positive pressure air seed metering mechanism includes rotating disc defining apertures extending therethrough that are sized to retain one or more seeds to be planted. The metering mechanism is connected to an air pump that blows air into the seed chamber and onto the surface of the disc. The high pressure caused by the air pump creates a high pressure in the chamber that forces seeds from a seed mass into the apertures where they are retained for subsequent release into the seed furrow as the seed member rotates. Vacuum seed meters typically include a vacuum source coupled to a separate chamber on the opposite side of the seed disc from the seed mass in the metering assembly. The vacuum pressure communicates through the disc apertures, and is sufficiently strong to draw the seed mass into the seed disc apertures. The seeds are held in the apertures until the disc rotates the seeds to the seed discharge area of the metering mechanism.

Some seeding machines have pneumatic, seed-on-demand, delivery systems in which the row unit seed reservoirs are automatically refilled with seed as needed from a main reservoir. Pneumatic, seed-on-demand, delivery systems automatically direct seed from a main seed reservoir to a plurality of individual row units. Each of the individual row units has an auxiliary seed reservoir for receiving the seed, a seed meter for metering the seed from the auxiliary seed reservoir, and a furrow opener into which the metered seed is deposited. A fan is used to create pressurized air that forms an air stream on which the seed is carried to the row units. These systems automatically replenish the auxiliary reservoirs as needed.

Pneumatic, seed-on-demand, seeding machines and other systems employ two large central seed reservoirs: one located on each side of the main frame. In these seeding machines the left seed reservoir supplies seed to all of the row units on the left side of the seeding machine, while the right seed reservoir supplies seed to all of the row units on the right side of the seeding machine. To this end, seeding systems employing centralized reservoirs require a large number of hoses to transport the seeds from the central seed reservoirs to the individual row units. This configuration of the seed distribution machines requires the seed delivery hoses to take sharp turns of up to 180 degrees, which inhibits the seed flow. These sharp turns create inefficiencies, add resistance to the seed flow, require extra supports to contain the hoses, and greatly reduce the cosmetic appearance of the machine.

In many cases, these systems have advantageously been designed to collapse into a position providing a reduced profile to facilitate transport between seeding operations, for example, over a road. Such systems typically include a small toolbar that is supplemented by a pair of wings that extend beyond the toolbar to provide the desired span across which the row units are arranged. These wings are typically connected to the frame or toolbar through a pivot and can be rotated to collapse the wings against the frame to provide the reduced profile. However, to provide for a full range of wing motion between the extended and collapsed positions, the hoses must have a large amount of excess length.

Therefore, it would be advantageous to have a system and method for seed delivery that does not require the hoses to take sharp turns. Furthermore, it would be advantageous to have a system and method for an adjustable seed delivery system that does not require a significant amount of excess hose length to facilitate a full range of motion.

SUMMARY OF THE INVENTION

The present invention overcomes the aforementioned drawbacks by providing a seed distribution system having the seed reservoirs located centrally and routing the seed delivery hoses so as to substantially reduce the creation of sharp turns in the seed delivery hose system. This system increases seed delivery efficiency, reduces the number of parts required for the seed distribution machine, reduces the complexity of the seed distribution machine, and improves the appearance of hose routing in the seed distribution machine. Furthermore, the system directs hoses from one seed reservoir located on one side of a central frame to row units located on the opposite side of the frame. Accordingly, the amount of hose needed to permit a full range of motion between a distribution position and a transportation position is significantly reduced.

In accordance with one aspect of the present invention, a seed distribution system is disclosed. The seed distribution system is configured to be transported by an agricultural vehicle along a direction of travel and includes a main frame extending along the direction of travel, a first wing frame extending from a first side of the main frame in a first direction that is substantially perpendicular to the direction of travel, and a second wing frame extending from a second side of the main frame in a second direction that is substantially perpendicular to the direction of travel. The system further includes at least one row unit arranged on the first side of the main frame and supported by the first wing frame, at least one row unit arranged on the second side of the main frame and supported by the second wing frame, a first seed reservoir arranged on the first side of the main frame, and a second seed reservoir arranged on the second side of the main frame. A first seed delivery hose assembly system connects the first seed reservoir to the at least one row unit arranged on the second side of the main frame, and a second seed delivery hose assembly system connects the second seed reservoir to the at least one row unit arranged on the first side of the main frame.

Additionally, the seed distribution system may include a plurality of row units arranged on the first side of the main frame and supported by the first wing frame and a plurality of row units arranged on the second side of the main frame and supported by the second wing frame.

The first seed delivery hose assembly system may also include a plurality of seed delivery hoses connected to only deliver seeds to the plurality of row units arranged on the second side of the main frame, and the second seed delivery hose assembly system may include a plurality of seed delivery hoses connected to only deliver seeds to the plurality of row units arranged on the first side of the main frame.

The seed distribution system may further include a first main toolbar pivot point that connects the first wing frame to the first side of the main frame and a second main toolbar pivot point that connects the second wing frame to the second side of the main frame to form respective pivot axes. The pivot axes allow the first and second wing frames to rotate between a transport position in which the wing frames are substantially parallel to the main frame and a seed distribution position in which the wing frames are substantially perpendicular to the main frame.

Additionally, the seed distribution system may include a first metering system to control the delivery of seeds from the first seed reservoir to the at least one row unit arranged on the second side of the main frame and a second metering system to control the delivery of seeds from the second seed reservoir to the at least one row unit arranged on the first side of the main frame.

The seed distribution system may further include a pneumatic distribution system connected to the first and second seed delivery hose assembly systems to direct the seeds from the first and second seed reservoirs to the row units.

Additionally, the first and second seed reservoirs and the pneumatic distribution system may be located ahead of the main toolbar pivot points.

Furthermore, one seed delivery hose assembly may include a plurality of hoses routed by the main pivot points of the toolbar in order for the seed delivery hoses to be substantially free of sharp turns.

Additionally, the first seed delivery hose assembly system may connect to a lower side of the first seed reservoir and may extend away from the first seed reservoir in a direction substantially perpendicular to the main frame and arcing toward the at least one row unit. The second seed delivery hose assembly system may connect to a lower side of the second seed reservoir and may extend away from the second seed reservoir in a direction substantially perpendicular to the main frame and arcing toward the at least one row unit.

In accordance with another aspect of the present invention, a seed distribution system is disclosed. The seed distribution system is configured to be transported by an agricultural vehicle along a direction of travel and includes a main frame extending along the direction of travel, a first wing frame extending from a first side of the main frame in a first direction that is substantially perpendicular to the direction of travel, and a second wing frame extending from a second side of the main frame in a second direction that is substantially perpendicular to the direction of travel. The system also includes at least one row unit arranged on the first side of the main frame and supported by the first wing frame, at least one row unit arranged on the second side of the main frame and supported by the second wing frame, a first seed reservoir arranged proximate to the axis of the main frame, and a second seed reservoir arranged proximate to the axis of the main frame. The system further includes a first seed hose assembly system that connects the first seed reservoir to the at least one row unit arranged on the first side of the main frame, where the hose assembly system extends away from the first seed reservoir along a substantially straight path and arcs toward the at least one row unit. A second seed hose assembly system connects the second seed reservoir to the at least one row unit arranged on the second side of the main frame, where the hose assembly system extends away from the second seed reservoir along a substantially straight path and arcs toward the at least one row unit.

Additionally, the seed distribution system may include a plurality of row units arranged on the first side of the main frame and supported by the first wing frame and a plurality of row units arranged on the second side of the main frame and supported by the second wing frame. The first seed delivery hose assembly system may include a plurality of seed delivery hoses connected to only deliver seeds to the plurality of row units arranged on the first side of the main frame, and the second seed delivery hose assembly system may include a plurality of seed delivery hoses connected to only deliver seeds to the plurality of row units arranged on the second side of the main frame.

The seed distribution system may also include a first main toolbar pivot point connecting the first wing frame to the first side of the main frame and a second main toolbar pivot point connecting the second wing frame to the second side of the main frame to form respective pivot axes. These pivot axes allow the first and second wing frames to rotate between a transport position in which the wing frames are substantially parallel to the main frame and a seed distribution position in which the wing frames are substantially perpendicular to the main frame.

The seed distribution system may further include a first metering system to control the delivery of seeds from the first seed reservoir to the at least one row unit that is arranged on the first side of the main frame and a second metering system to control the delivery of seeds from the second seed reservoir to the at least one row unit that is arranged on the second side of the main frame.

Additionally, the seed distribution system may include a pneumatic distribution system connected to the first and second seed delivery hose assembly systems to direct the seeds from the first and second seed reservoirs to the row units.

Additionally, the first and second seed reservoirs and the pneumatic distribution system may be located ahead of the main toolbar pivot points.

Furthermore, one seed delivery hose assembly may include a plurality of hoses routed by the main pivot points of the toolbar in order for the seed delivery hoses to be substantially free of sharp turns.

Additionally, the first seed delivery hose assembly system may connect to a lower side of the first seed reservoir and may extend away from the first seed reservoir in a direction substantially perpendicular to the main frame and arcing toward the at least one row unit. The second seed delivery hose assembly system may connect to a lower side of the second seed reservoir and may extend away from the second seed reservoir in a direction substantially perpendicular to the main frame and arcing toward the at least one row unit.

In accordance with another aspect of the invention, a method of manufacturing a seed distribution system configured to be transported by an agricultural vehicle along a direction of travel includes providing a main frame extending from a first end to a second end along a substantially straight line in the direction of travel. The method also includes connecting a first wing frame to a first side of the main frame in a first direction substantially perpendicular to the direction of travel and connecting a second wing frame to a second side of the main frame in a second direction substantially perpendicular to the direction of travel. The method further includes arranging at least one row unit on the first side of the main frame and supporting the at least one row unit by the first wing frame, arranging at least one row unit on the second side of the main frame and supporting the at least one row unit by the second wing frame, mounting a first seed reservoir on the first side of the main frame, and mounting a second seed reservoir on the second side of the main frame. Also, the method includes connecting the first seed reservoir to the at least one row unit arranged on the second side of the main frame with a first seed delivery hose assembly system and connecting the second seed reservoir to the at least one row unit arranged on the first side of the main frame with a second seed delivery hose assembly system.

Additionally, the method of connecting the first wing frame to the first side of the main frame may include providing a first pivot point connecting the first wing frame to the first side of the main frame, and connecting the second wing frame to the second side of the main frame may include providing a second pivot point connecting the second wing frame to the second side of the main frame.

Furthermore, connecting the first seed reservoir to the at least one row unit may include arranging the first seed delivery hose assembly system to extend in a direction substantially perpendicular to the main frame to configure the first seed delivery hose assembly system to be substantially free of sharp turns, and connecting the second seed reservoir to the at least one row unit may include arranging the second seed delivery hose assembly system to extend in a direction substantially perpendicular to the main frame to configure the second seed delivery hose assembly system to be substantially free of sharp turns.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Reference is hereby made to the following drawings in which like reference numerals correspond to like elements throughout, and in which.

DETAILED DESCRIPTION OF THE PREFERRED EMBODIMENT

Figure 1:
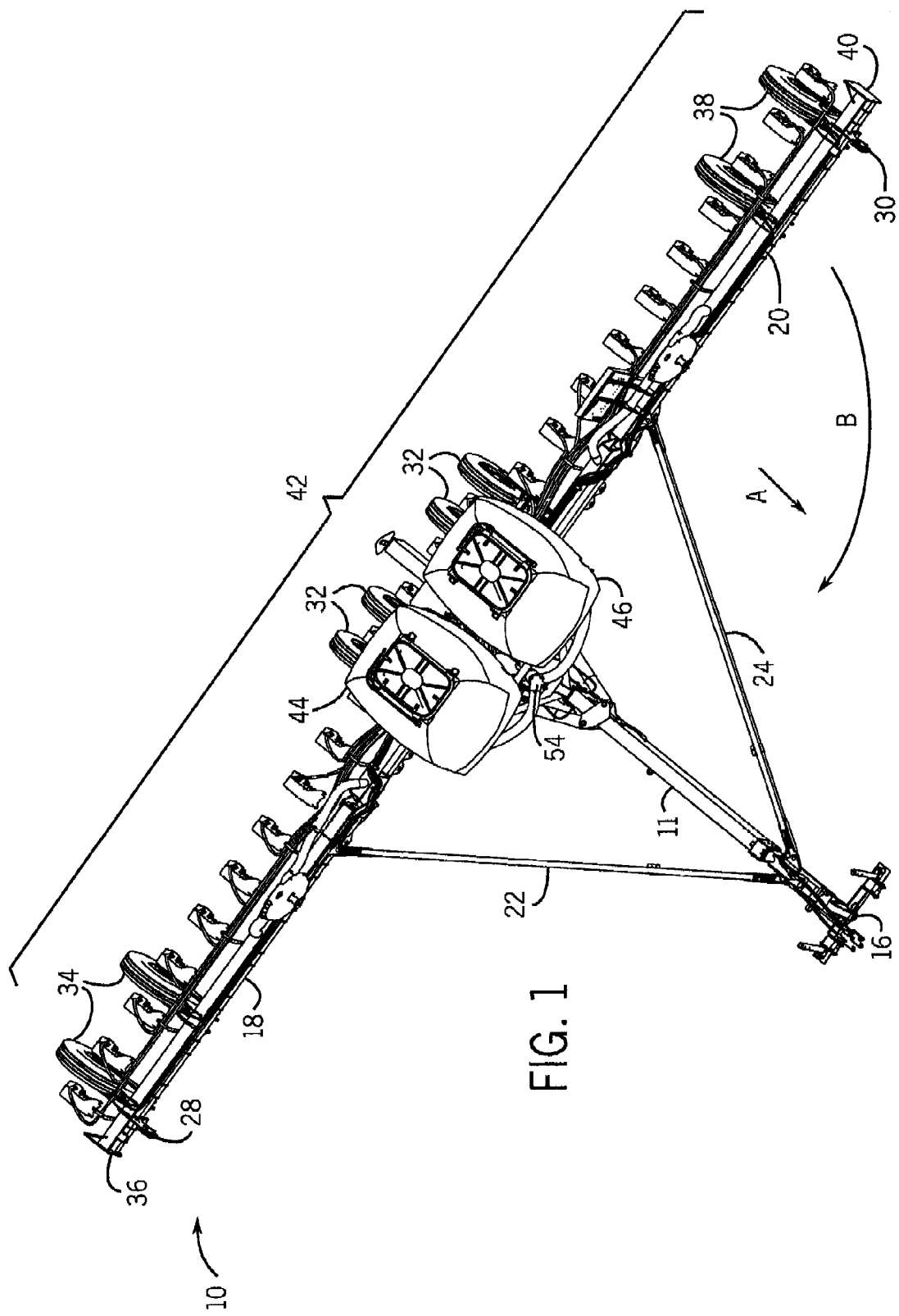
FIG. 1 is a perspective view of a seed distribution system in a seed distribution position and including a crisscross delivery system in accordance with the present invention.

Referring to FIG. 1, a seed distribution system (or planter) 10 includes a central frame 11 extending along a direction of travel indicated by arrow A. The seed distribution system 10 also includes a laterally extending toolbar 12, illustrated in FIG. 3, which extends transversely to the direction of travel and is connected to the central frame 11. A tow bar connector 16 is disposed at the longitudinally forward end of the central frame 11 opposite the toolbar 12 and is configured to mate with a corresponding hitch, or the like, of a towing tractor or similar agricultural vehicle (not shown). In the illustrated embodiment, the tow bar 16 and the frame 11 extend along a longitudinal centerline of the seed distribution system 10 substantially perpendicular to the toolbar 12.

Figure 2:
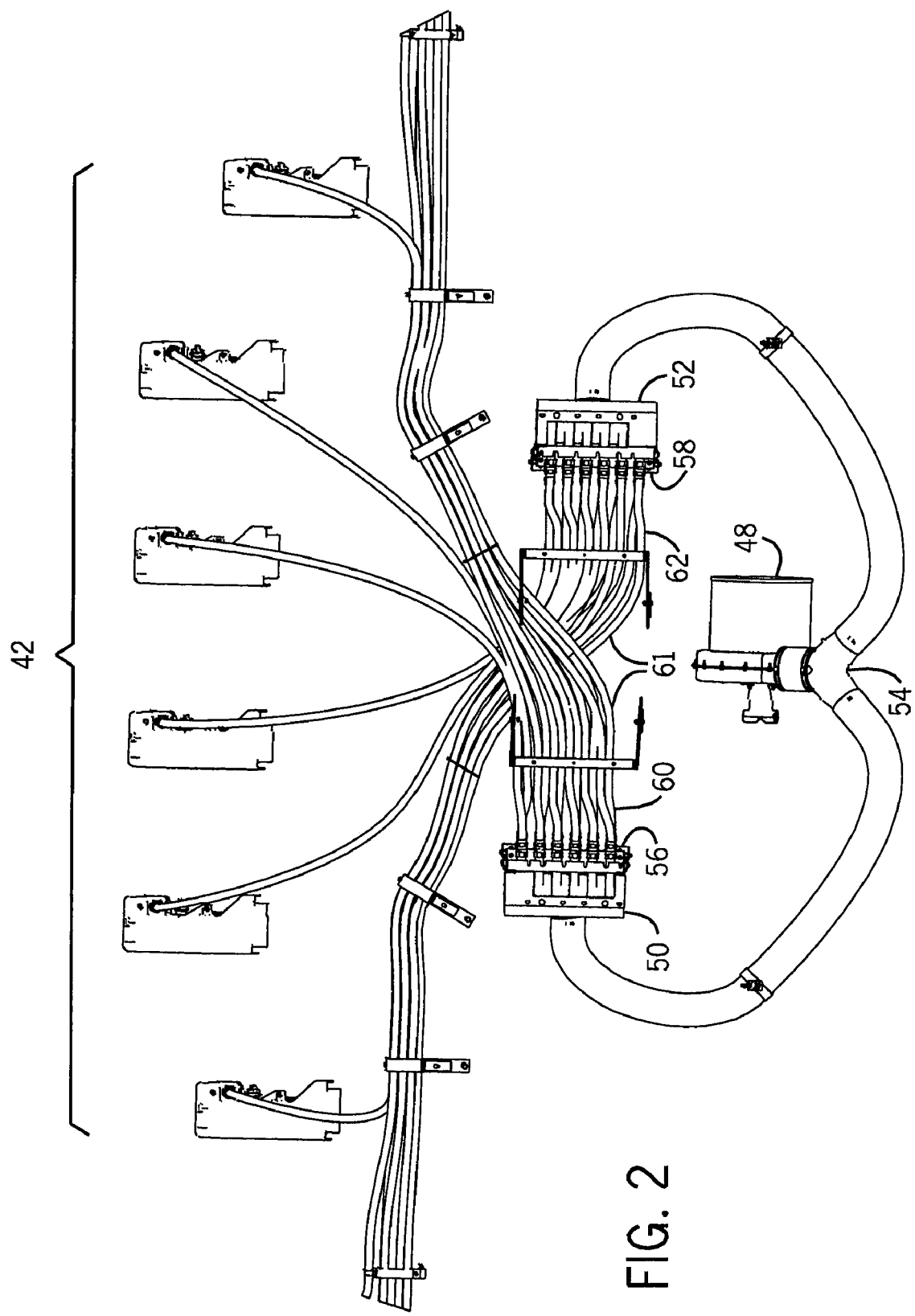
FIG. 2 is a perspective view of the distribution system of FIG. 1 with the seed reservoirs removed to further show the crisscross delivery system in accordance with the present invention.

Left and right wing frames 18, 20 extend transversely outward and substantially perpendicular to the central frame 11 when the seed distribution system 10 is in an extended or seed distribution position, as illustrated in FIGS. 1 and 2. The left and right wing frames 18, 20 are coupled to the central main frame 11 by left and right links 22, 24. Accordingly, the left wing frame 18 is pivotally coupled to the central frame 11 about vertical main pivot axis 26 (see FIG. 3), and the right wing frame 20 is pivotally coupled to the central frame 11 about vertical main pivot axis 27 (see FIG. 3). Therefore, the left and right wing frames 18, 20 can be rotated about the left and right axes 26, 27 through the links 22, 24. As will be described with respect to FIG. 3, this arrangement enables the wings 18, 20 to move between the seed distribution or extended position illustrated in FIGS. 1 and 2 and a transport position illustrated in FIG. 3. As will be described, the transverse ends of the wing frames 18, 20 are provided with left and right hooks 28, 30 for attaching to the tow bar connector 16 when the seed distribution system 10 is in transport position.

The toolbar 12 is supported on the ground by two pairs of inner wheels 32 disposed on opposite sides of the central frame 11. The left wing frame 18 is supported by left outer wheels 34, which are disposed proximate to an outer end 36 of the left wing frame 18. Similarly, the right wing frame 20 is supported by right outer wheels 38, which are disposed proximate to an outer end 40 of the right wing frame 20.

A plurality of seed planting units (or row units) 42 is arranged longitudinally along the left and right wing frames 18, 20 when the seed distribution system 10 is in its seed distribution position. As is well known in the art, the row units 42 are mounted in a side-by-side (lateral) relation relative to each other along the left and right wing frames 18, 20 and, in some cases, across the toolbar 12 as well. The row units 42 are shown to be approximately equally spaced, with half of the row units 42 arranged left of the central frame 11 and the other half of the row units 42 arranged right of the central frame 11. Left and right main seed reservoirs 44 and 46 are mounted to the central frame 11 ahead of the left and right vertical main pivot points 26, 27.

During operation, the seed distribution system 10 travels along the ground upon the plurality of wheels 32, 34, and 38, and is towed by an agricultural vehicle such as a tractor (not shown). Forward movement of the tractor causes the row units 42 to ride along the ground and distribute seeds.

Referring to FIG. 2, an air pump 48 directs a pressurized air stream to left and right manifold assemblies 50, 52. The air pump 48 may be driven by an electric motor, a hydraulic motor, or any other suitable driving system. The air pump 48 directs the pressurized air stream to the left and right manifold assemblies 50, 52 through a main air hose 54. The left manifold assembly 50 has a plurality of manifold outlets 56 corresponding to the number of row units 42 mounted to the right wing frame 20. The right manifold assembly 52 has a plurality of manifold outlets 58 corresponding to the number of row units 42 mounted to the left wing frame 18. As will be described, seeds located in the seed reservoirs 44, 46 are gravity fed to the manifold assemblies 50, 52.

Left and right seed delivery hose assembly systems 60, 62 are connected to the respective manifold assemblies 50, 52. The seed delivery hose assembly systems 60, 62 include a plurality of seed delivery hoses that are coupled together in bundles, generally designated 61. The left seed delivery hose assembly system 60 extends transversely from the left manifold outlets 56 across the central frame 11 and directs air and entrained seeds to the individual metering systems on the row units 42 mounted on the right wing frame 20. To this end, in operation, the left seed delivery hose assembly system 60 is configured so that seeds from the left main seed reservoir 44 are delivered to the row units 42 mounted on the right wing frame 20. Conversely, the right seed delivery hose assembly system 62 extends transversely from the right manifold outlets 58 across the central frame 11 and directs air and entrained seeds to the individual metering systems on the row units 42 located on the left wing frame 18. Accordingly, in operation, the right seed delivery hose assembly system 62 is configured so that seeds from the right main seed reservoir 46 are delivered to the row units 42 mounted on the left wing frame 18.

The crisscross configuration illustrated in FIG. 2 whereby the left seed delivery hose assembly system 60 connects the left seed reservoir 44 to the row units 42 mounted on the right wing frame 20 and the right seed delivery hose assembly system 62 connects the right seed reservoir 46 to the row units 42 mounted on the left wing frame 18 substantially increases the efficiency of the seed distribution system 10. In the illustrated configuration, the seed delivery hose assembly systems 60, 62 extend out from the manifold outlets 56, 58 toward the main frame 11 and substantially perpendicular to the main frame 11, and then gradually arc toward the row units 42. It is contemplated that this arrangement may be modified, for example, such that the seed delivery hose assembly systems 60, 62 extend away from the main frame 11 at an angle of greater or less than 90 degrees. For example, it is contemplated that an angle of 45 degrees may be desirable in some configuration, such as when using a 30 or 40 foot wing span, as opposed to a 60 foot wing span.

In any case, this arrangement initially creates a substantially straight path in the seed delivery hoses 61, which reduces binding, kinking, and resistance to the seed flow. After crossing the main frame 11, the individual seed delivery hoses 61 begin to arc toward the row units 42. This path is still substantially free from sharp turns thereby allowing the seed to flow freely from the left and right seed reservoirs 44, 46 to the row units 42. This configuration of the seed delivery hose assembly systems 60, 62 is also beneficial because it reduces the length of hose 61 required to extend from the manifold outlets 56, 58 to the row units 42, as will be described with respect to FIG. 3.

Figure 3:
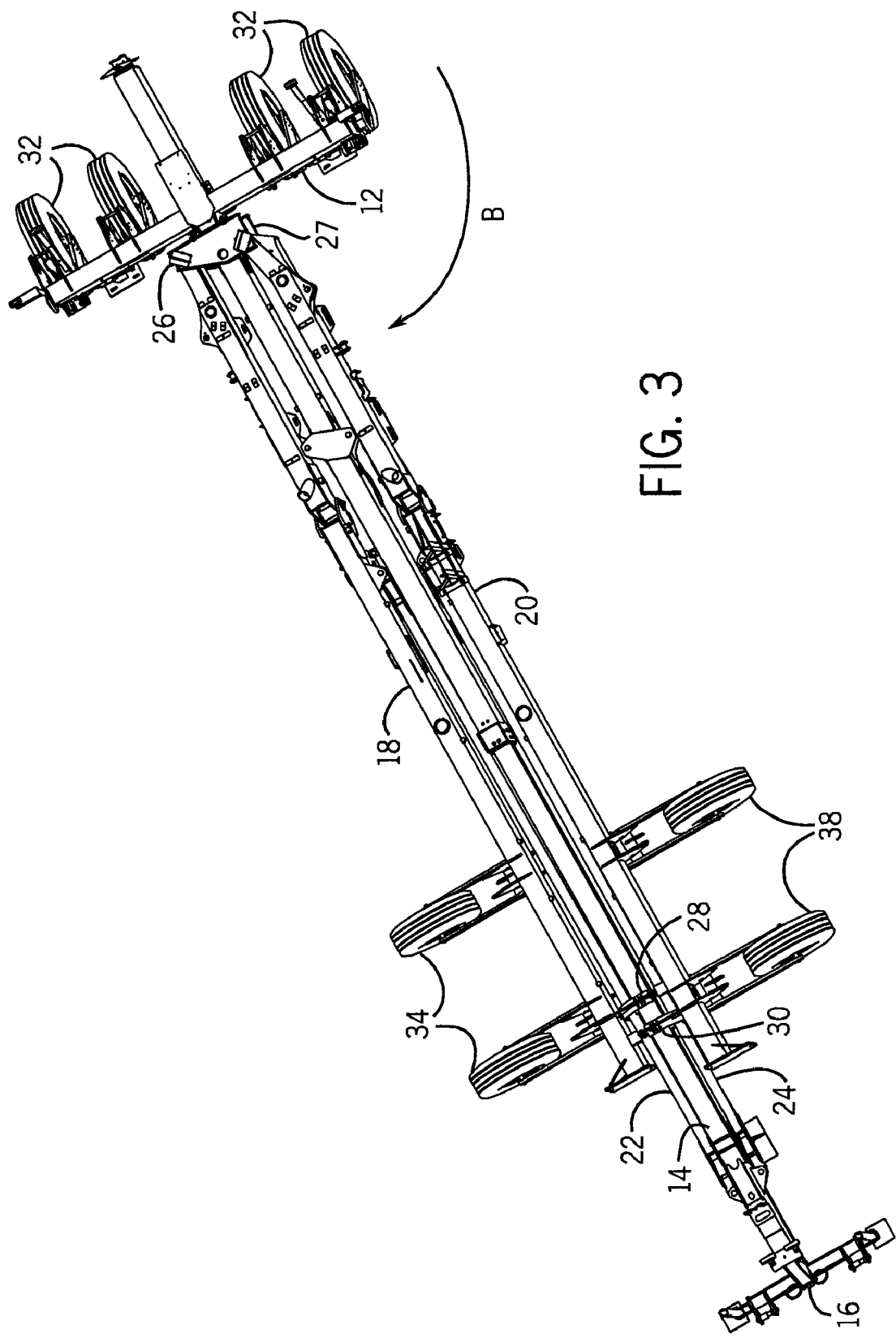
FIG. 3 is a perspective view of the distribution system of FIGS. 1 and 2 arranged in a transport position.

Referring now to FIG. 3, the seed delivery system 10 is in its transport position. The left and right wing frames 18, 20 can be rotated about the left and right pivot axes 26, 27 through the links 22, 24. In order to move the seed delivery system 10 from the extended, seed distribution position illustrated in FIG. 1 to the collapsed, transport position illustrated in FIG. 3, the left and right wing frames 18, 20 rotate about the left and right pivot axes 26, 27 following an arc B. The left and right wing frames 18, 20 rotate forward until substantially parallel to the central frame 11. The transverse ends 36, 40 of the wing frames 18, 20 are provided with left and right hooks 28, 30 for attaching to the tow bar connector 16, thus securing the seed delivery system 10 in transport position. In the transport position, the inner wheels 32 extending from the toolbar 12 are the only wheels in contact with the ground. That is, the left and right outer wheels 34 and 38 are lifted with the left and right wing frames 18 and 20.

As the left and right wing frames 18, 20 travel along the arc B, the row units 42 maintain a substantially fixed distance from the left and right seed reservoirs 44, 46. Due to the centralized location of the left and right seed reservoirs 44, 46 and the strategic configuration of the left and right manifold outlets 56, 58 in which the seed delivery hose assembly systems 56, 58 extend toward the central frame 11, very little excess hose length is required to transfer the seed distribution system 10 from the extended, seed distribution position shown in FIG. 1 to the collapsed, transport position shown in FIG. 3. By using the shortest length of hose possible in the left and right seed hose delivery assemblies 60, 62, manufacturing costs decrease, the opportunity to damage the individual hoses 61 decreases, and the overall aesthetic appearance of the seed distribution system 10 is improved in both the seed distribution position and the transport position.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

The invention claimed is:

1. A seed distribution system configured to be transported by an agricultural vehicle along a direction of travel comprising:

a main frame extending along the direction of travel;

a left wing frame extending from a first side of the main frame in a first direction substantially perpendicular to the direction of travel;

a right wing frame extending from a second side of the main frame in a second direction substantially perpendicular to the direction of travel;

at least one row unit arranged on the first side of the main frame and supported by the left wing frame;

at least one row unit arranged on the second side of the main frame and supported by the right wing frame;

a first seed reservoir arranged on the first side of the main frame;

a second seed reservoir arranged on the second side of the main frame;

a plurality of row units arranged on the first side of the main frame and supported by the first wing frame and a plurality of row units arranged on the second side of the main frame and supported by the second wing frame;

an air pump connected to a main hose which directs pressurized air stream to a left and right manifold assembly;

said left manifold assembly having a plurality of manifold outlets corresponding to said number of row units mounted to said left wing frame;

said right manifold assembly having a plurality of manifold outlets corresponding to said number of row units mounted to right wing frame;

said plurality of manifold outlets connected to a left and a right seed delivery hose assembly system each having a plurality of seed delivery hoses coupled as bundles to each respective manifold outlets;

said left seed delivery hose assembly system connecting the first seed reservoir to the at least one row units arranged on said second side of the main frame;

said right seed delivery hose assembly system connecting to the second seed reservoir to the at least one row unit arranged on the first side of the main frame;

said left seed delivery hose assembly extends transversely from the left manifold outlets across said main frame and direct air and seed to respective row units mounted on said right wing frame; and said right seed delivery hose assembly extends transversely from the right manifold outlets across said main frame and direct air and seed to said row units mounted on the left wing frame.

2. The seed distribution system of claim 1, further comprising a first main pivot point connecting the first wing frame to the first side of the main frame and a second main pivot point connecting the second wing frame to the second side of the main frame to form respective pivot axes to allow the first and second wing frames to rotate between a transport position in which the wing frames are substantially parallel to the main frame and a seed distribution position in which the wing frames are substantially perpendicular to the main frame.

3. The seed distribution system of claim 2, further comprising a first metering system to control the delivery of seeds from the first seed reservoir to the at least one row unit arranged on the second side of the main frame and a second metering system to control the delivery of seeds from the second seed reservoir to the at least one row unit arranged on the first side of the main frame.

4. The seed distribution system of claim 3, further comprising a pneumatic distribution system connected to the first and second seed delivery hose assembly systems to direct the seeds from the first and second seed reservoirs to the row units.

5. The seed distribution system of claim 3, wherein the first and second seed reservoirs and the pneumatic distribution system are located ahead of the main pivot points.

6. The seed distribution system of claim 2, wherein one seed delivery hose assembly includes a plurality of hoses routed by the main pivot points to be substantially free of sharp turns on seed delivery hoses.

7. The seed distribution system of claim 1, wherein the first seed delivery hose assembly system connects to a lower side of the first seed reservoir and extends away from the first seed reservoir substantially perpendicular to the main frame and arcing toward the at least one row unit, and wherein the second seed delivery hose assembly system connects to a lower side of the second seed reservoir and extends away from the second seed reservoir substantially perpendicular to the main frame and arcing toward the at least one row unit.

8. A seed distribution system configured to be transported by an agricultural vehicle along a direction of travel comprising:

a main frame extending along the direction of travel;

a left wing frame extending from a first side of the main frame in a first direction substantially perpendicular to the direction of travel;

a right wing frame extending from a second side of the main frame in a second direction substantially perpendicular to the direction of travel;

at least one row unit arranged on the first side of the main frame and supported by the left wing frame;

at least one row unit arranged on the second side of the main frame and supported by the right wing frame;

a first seed reservoir arranged proximate to the axis of the main frame;

a second seed reservoir arranged proximate to the axis of the main frame;

a plurality of row units arranged on the first side of the main frame and supported by the first wing frame and a plurality of row units arranged on the second side of the main frame and supported by the second wing frame;

an air pump connected to a main hose which directs pressurized air stream to a left and right manifold assembly;

said left manifold assembly having a plurality of manifold outlets corresponding to said number of row units mounted to said left wing frame;

said right manifold assembly having a plurality of manifold outlets corresponding to said number of row units mounted to right wing frame;

said plurality of manifold outlets connected to a left and a right seed delivery hose assembly system each having a plurality of seed delivery hoses coupled as bundles to each respective manifold outlets;

said left seed delivery hose assembly system connecting the first seed reservoir to the at least one row units arranged on said second side of the main frame;

said right seed delivery hose assembly system connecting to the second seed reservoir to the at least one row unit arranged on the first side of the main frame;

said left seed delivery hose assembly extends transversely from the left manifold outlets across said main frame and direct air and seed to respective row units mounted on said right wing frame; and said right seed delivery hose assembly extends transversely from the right manifold outlets across said main frame and direct air and seed to said row units mounted on the left wing frame.

9. The seed distribution system of claim 8, further comprising a first main pivot point connecting the first wing frame to the first side of the main frame and a second main pivot point connecting the second wing frame to the second side of the main frame to form respective pivot axes to allow the first and second wing frames to rotate between a transport position in which the wing frames are substantially parallel to the main frame and a seed distribution position in which the wing frames are substantially perpendicular to the main frame.

10. The seed distribution system of claim 9, further comprising a first metering system to control the delivery of seeds from the first seed reservoir to the at least one row unit arranged on the first side of the main frame and a second metering system to control the delivery of seeds from the second seed reservoir to the at least one row unit arranged on the second side of the main frame.

11. The seed distribution system of claim 10, further comprising a pneumatic distribution system connected to the first and second seed delivery hose assembly systems to direct the seeds from the first and second seed reservoirs to the row units.

12. The seed distribution system of claim 9, wherein the first and second seed reservoirs and the pneumatic distribution system are located ahead of the main pivot points.

13. The seed distribution system of claim 9, wherein one seed delivery hose assembly includes a plurality of hoses routed by the main pivot points to be substantially free of sharp turns on seed delivery hoses.

* * * * *